United States Patent
Harada et al.

(10) Patent No.: US 10,368,296 B2
(45) Date of Patent: Jul. 30, 2019

(54) USER TERMINAL, BASE STATION AND RADIO COMMUNICATION METHOD

(71) Applicant: NTT DOCOMO, INC., Tokyo (JP)

(72) Inventors: Hiroki Harada, Tokyo (JP); Kazuaki Takeda, Tokyo (JP); Satoshi Nagata, Tokyo (JP)

(73) Assignee: NTT DOCOMO, INC., Tokyo (JP)

(*) Notice: Subject to any disclaimer, the term of this patent is extended or adjusted under 35 U.S.C. 154(b) by 50 days.

(21) Appl. No.: 15/308,890

(22) PCT Filed: Apr. 17, 2015

(86) PCT No.: PCT/JP2015/061894
§ 371 (c)(1),
(2) Date: Nov. 4, 2016

(87) PCT Pub. No.: WO2015/170569
PCT Pub. Date: Nov. 12, 2015

(65) Prior Publication Data
US 2017/0064613 A1 Mar. 2, 2017

(30) Foreign Application Priority Data
May 8, 2014 (JP) .................... 2014-097143

(51) Int. Cl.
*H04J 11/00* (2006.01)
*H04W 16/32* (2009.01)
(Continued)

(52) U.S. Cl.
CPC ......... *H04W 48/12* (2013.01); *H04J 11/0079* (2013.01); *H04W 16/32* (2013.01);
(Continued)

(58) Field of Classification Search
CPC ...... H04J 11/079; H04W 16/32; H04W 48/16
See application file for complete search history.

(56) References Cited

U.S. PATENT DOCUMENTS

2013/0051240 A1* 2/2013 Bhattad ............... H04L 5/005
370/241
2014/0038598 A1* 2/2014 Ren ................... H04W 48/16
455/434
(Continued)

FOREIGN PATENT DOCUMENTS

WO 2012176319 A1 12/2012

OTHER PUBLICATIONS

Extended European Search Report issued in corresponding European Patent Application No. 15789916.2, dated Dec. 8, 2017 (8 pages).
(Continued)

*Primary Examiner* — Asghar H Bilgrami
(74) *Attorney, Agent, or Firm* — Osha Liang LLP

(57) ABSTRACT

The present invention is designed so that small cell detection operations are carried out adequately based on whether or not assist information from the network is present. A user terminal communicates with a base station forming a small cell and a base station forming a macro cell having a coverage area in which the small cell is included, and this user terminal has a receiving section that receives a small cell detection command, which is transmitted from the macro cell and which includes timing information and assist information, a detection section that detects a PSS/SSS, included in a small cell detection reference signal transmitted from the small cell, in accordance with the timing information, and a measurement section that measures a measurement reference signal, which is included in the small cell detection reference signal, in accordance with the detected PSS/SSS and the assist information.

5 Claims, 13 Drawing Sheets

(51) Int. Cl.
*H04W 48/16* (2009.01)
*H04W 48/12* (2009.01)
*H04W 36/00* (2009.01)
H04W 84/04 (2009.01)
H04W 88/02 (2009.01)

(52) U.S. Cl.
CPC .... *H04W 36/0055* (2013.01); *H04W 36/0061* (2013.01); *H04W 36/0088* (2013.01); *H04W 48/16* (2013.01); *H04W 84/045* (2013.01); *H04W 88/02* (2013.01)

(56) References Cited

U.S. PATENT DOCUMENTS

| | | | |
|---|---|---|---|
| 2014/0086173 A1* | 3/2014 | Sadeghi | H04L 5/005 370/329 |
| 2014/0094168 A1 | 4/2014 | Aikawa | |
| 2014/0302855 A1* | 10/2014 | Nory | H04W 48/10 455/437 |
| 2015/0092582 A1* | 4/2015 | Liao | H04J 11/005 370/252 |
| 2015/0215874 A1* | 7/2015 | Chen | H04W 52/18 455/522 |
| 2016/0227526 A1* | 8/2016 | Park | H04L 5/0048 |
| 2017/0150428 A1* | 5/2017 | Nory | H04W 48/16 |

OTHER PUBLICATIONS

Office Action issued in corresponding Japanese Application No. 2016-517854, dated Sep. 5, 2017 (9 pages).

International Search Report issued in corresponding application No. PCT/JP2015/061894 dated Jun. 16, 2015 (3 pages).

Written Opinion of the International Searching Authority issued in corresponding application No. PCT/JP2015/061894 dated Jun. 16, 2015 (3 pages).

NTT DOCOMO, "Views on network assistance for Rel. 12 discovery procedure"; 3GPP TSG RAN WG1 Meeting #76bis, R1-141465; Shenzhen, China; Mar. 31-Apr. 4, 2014 (4 pages).

MediaTek Inc., "Performance evaluation for small cell discovery using legacy reference signals"; 3GPP TSG-RAN WG1 #72bis, R1-131684; Chicago, USA; Apr. 15-19, 2013 (5 pages).

3GPP TS 36.300 V11.4.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)"; Dec. 2012 (208 pages).

3GPP TR 36.814 V9.0.0, "3rd Generation Partnership Project; Technical Specification Group Radio Access Network; Evolved Universal Terrestrial Radio Access (E-UTRA); Further advancements for E-UTRA physical layer aspects (Release 9)"; Mar. 2010 (107 pages).

3GPP TS 36.211 V10.4.0, "3rd Generation Partnership Project; Technical Specification Group Radio Access Network; Evolved Universal Terrestrial Radio Access (E-UTRA); Physical Channels and Modulation (Release 10)"; Dec. 2011 (101 pages).

Extended European Search Report issued in corresponding European Patent Application No. 18194231.9, dated Oct. 8, 2018 (8 pages).

Huawei et al., "Network assistance for small cell discovery", 3GPP TSG RAN WG1 Meeting #76bis, R1-141127, Shenzhen, China, Mar. 31-Apr. 4, 2014 (3 pages).

* cited by examiner

| SCRAMBLING ID | 0 |
|---|---|
| CSI-RS CONFIG | 0,5,10,11 |

| SCRAMBLING ID | 2 |
|---|---|
| CSI-RS CONFIG | 3,8,16,17 |

UE
· MEASURES BOTH
· MEASURES ONLY THAT IN WHICH PCID ACQUIRED BY PSS/SSS DETECTION = SCRAMBLING ID

FIG.6A

| CSI-RS CONFIG | 0,5,10,11 |
|---|---|

| CSI-RS CONFIG | 3,8,16,17 |
|---|---|

UE
· MEASURES ALL COMBINATIONS IN WHICH PCID ACQUIRED BY PSS/SSS DETECTION = SCRAMBLING ID
· MEASURES CONFIG. INCLUDING MOD (PCID, 5)

FIG.6B

COMMON ASSIST INFORMATION

| NUMBER OF SIMULTANEOUS CONFIGURATIONS | 4 |
|---|---|

CELL/TP-SPECIFIC ASSIST INFORMATION

| CSI-RS CONFIG | 0 |
|---|---|
| CSI-RS CONFIG | 3 |

CRS

PRS

TIME
FREQUENCY

USER TERMINAL, BASE STATION AND RADIO COMMUNICATION METHOD

TECHNICAL FIELD

The present invention relates to a user terminal, a base station and a radio communication method in a next-generation mobile communication system.

BACKGROUND ART

In the UMTS (Universal Mobile Telecommunications System) network, the specifications of long term evolution (LTE) have been drafted for the purpose of further increasing high speed data rates, providing lower delays and so on (see non-patent literature 1). In LTE, as multiple-access schemes, a scheme that is based on OFDMA (Orthogonal Frequency Division Multiple Access) is used in downlink channels (downlink), and a scheme that is based on SC-FDMA (Single Carrier Frequency Division Multiple Access) is used in uplink channels (uplink).

Furthermore, successor systems of LTE (referred to as, for example, "LTE-advanced" or "LTE enhancement" (hereinafter referred to as "LTE-A")) have been under study for the purpose of achieving further broadbandization and increased speed beyond LTE. In the LTE-A system, a HetNet (Heterogeneous Network), in which small cells (for example, pico cells, femto cells and so on), each having a local coverage area of a radius of approximately several tens of meters, are formed inside a macro cell having a wide coverage area of a radius of approximately several kilometers, is under study (see, for example, non-patent literature 2). Also, in relationship to the HetNet, a study is in progress to use carriers of different frequency bands between a macro cell (macro base station) and a small cell (small base station), in addition to the same frequency band.

CITATION LIST

Non-Patent Literature

Non-Patent Literature 1: 3GPP TS 36. 300 "Evolved Universal Terrestrial Radio Access (E-UTRA) and Evolved Universal Terrestrial Radio Access Network (E-UTRAN); Overall Description; Stage 2"

Non-Patent Literature 2: 3GPP TR 36.814 "E-UTRA Further Advancements for E-UTRA Physical Layer Aspects"

SUMMARY OF INVENTION

Technical Problem

In the above HetNet, many small cells may be placed in the macro cell. In this case, it may be possible to arrange small cells in a localized manner in places where the traffic is heavy, so as to achieve an off-loading effect between the cells. In an environment like this, a new small cell detection mechanism ("small cell discovery") is under study for introduction as a method of allowing a user terminal to efficiently detect and connect with small cells. "Detection" (discovery) in this context refers generally to operations including, at least, cell and transmission point (TP) identification, coarse time/frequency synchronization, and RRM (Radio Resource Management) measurement with the connecting cell in the same frequency and in different frequencies (intra/inter-frequency RRM measurement).

In small cell detection (small cell discovery), a user terminal may be in the state of being connected with a network—for example, a macro cell—so that, when necessary, the network can provide assist information for small cell detection. However, since the assist information that can be provided may vary depending on the network structure, implementation, and so on, when small cell detection (small cell discovery) operations are carried out using a DRS (Discovery Reference Signal), which includes a PSS/SSS/CRS/CSI-RS, it is preferable to design each user terminal operation to be executable whether or not there is assist information from the network.

The present invention has been made in view of the above, and it is therefore an object of the present invention to provide a user terminal, a base station and a radio communication method, whereby small cell detection operations can be carried out adequately based on whether or not there is assist information from the network.

Solution to Problem

The user terminal of the present invention is provided in the form of a user terminal that communicates with a base station forming a small cell and a base station forming a macro cell having a coverage area in which the small cell is included, and this user terminal has a receiving section that receives a small cell detection command, which is transmitted from the macro cell and which includes timing information and assist information, a detection section that detects a synchronization signal, which is included in a small cell detection reference signal transmitted from the small cell, in accordance with the timing information, and a measurement section that measures a measurement reference signal, which is included in the small cell detection reference signal, in accordance with the detected synchronization signal and the assist information, and the values of the offset, the period and the duration of the small cell detection reference signal are included in the timing information, and the values of a physical cell ID of the small cell or a transmission point, a scrambling ID that is used for the measurement reference signal, a time/frequency resource configuration index and a subframe offset are included in the assist information.

Advantageous Effects of Invention

According to the present invention, small cell detection operations can be carried out adequately based on whether or not there is assist information from the network.

BRIEF DESCRIPTION OF DRAWINGS

FIGS. 6 provide diagrams to explain examples of measurements by user terminals;

FIG. 7 is a diagram to explain examples of time/frequency resource configuration indices;

DESCRIPTION OF EMBODIMENTS

Now, an embodiment of the present invention will be described below in detail with reference to the accompanying drawings. In small cell detection, DRS-based measurement can be configured for user terminals in RRC (Radio Resource Control) connected mode (RRC CONNECTED). Also, in each carrier, one measurement timing configuration (measurement timing configuration) is configured. This measurement timing configuration includes, at least, the offset and the period of the DRS. The DRS includes at least a PSS/SSS (Primary Synchronization Signal/Secondary Synchronization Signal), and, in addition, includes one or both of a CRS (Cell-specific Reference Signal) and a CSI-RS (Channel State Information-Reference Signal).

In small cell detection, a user terminal detects small cells by using assist from the network (which is, for example, a base station). To be more specific, a small cell transmits the DRS in a long period, the network reports timing information for measuring the DRS and so on to a user terminal, and the user terminal measures the DRS by using the reported timing and so on. Also, based on, for example, the receiving state (RSRP (Reference Signal Received Power)/RSRQ (Reference Signal Received Quality)) reported from the user terminal having detected the DRS, the network may control the connection of the user terminal with the small cells.

The measurement timing configuration is configured in a user terminal in RRC connected mode from the connecting cell, so that it is possible to efficiently carry out the DRS detection and measurement only in timings the DRS is transmitted. Also, even when the timings of the macro cell and the small cells do not match due to differences in propagation delay and so on, it is still possible to acquire the DRS timing by means of the PSS/SSS.

Figure 1A:
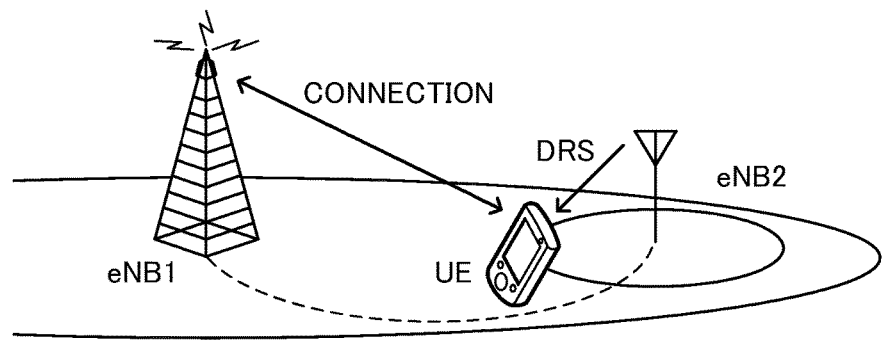
FIGS. 1 provide diagrams to explain the DRS in small cell detection.

FIG. 1A shows a system comprised of a small base station eNB2, which forms a small cell, a macro base station eNB1, which forms a macro cell, and the coverage area of which includes the small cell, and a user terminal UE, which can communicate with the macro base station eNB1 and the small base station eNB2. The macro base station eNB1 and the small base station eNB2 are synchronized, or each knows the other's timing difference.

The macro base station eNB1 commands the user terminal UE connected with the base station eNB1 as to whether or not to carry out small cell detection using the DRS. When small cell detection is carried out, the macro base station eNB1 reports timing information (measurement timing configuration) to the user terminal UE. Furthermore, the macro base station eNB1 may also report assist information to the user terminal UE.

The macro base station eNB1 commands the small cell detection to the user terminal through higher layer signaling (for example, RRC signaling). To be more specific, the macro base station eNB1 includes information regarding whether or not small cell detection is carried out using the DRS in the information element to define the measurement object (hereinafter also referred to as "MeasObject"), and reports this to the user terminal. For example, the macro base station eNB1 includes the small cell detection command (DiscoveryConfig) in MeasObject and reports this to the user terminal UE, and, meanwhile, includes timing information and assist information in, for example, the information element to define the small cell detection reference signal configuration (DiscoveryRS-Config), and reports this to the user terminal UE.

The user terminal, commanded small cell detection from the network, executes small cell detection using the DRS.

Figure 1B:
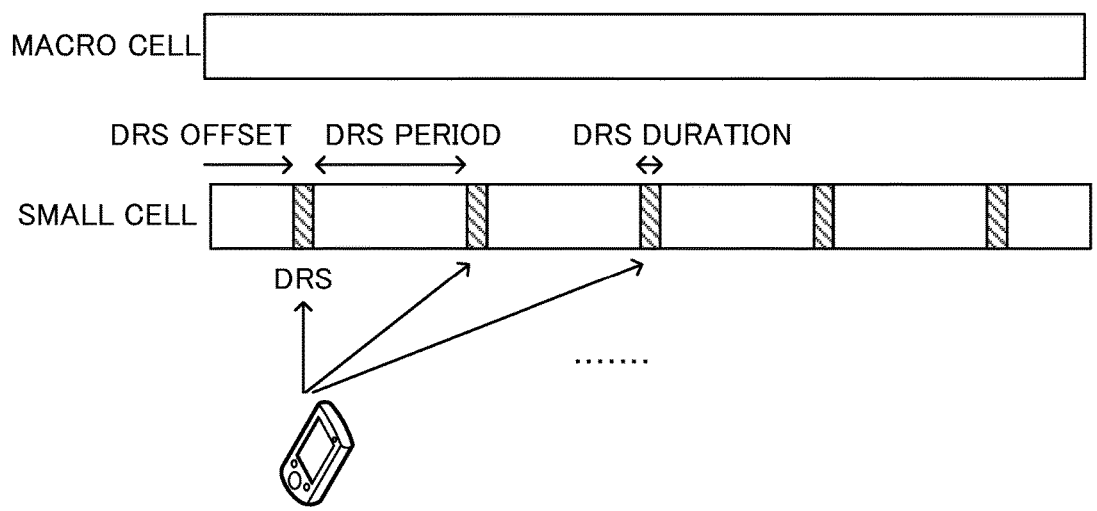

As shown in FIG. 1B, assume that the duration until a small cell transmits the first DRS is the DRS offset. The DRS is transmitted in the DRS period. The DRS duration refers to the length of time in which the synchronization signals and the measurement reference signal included in the DRS are transmitted in one DRS period. Information pertaining to these DRS offset, DRS period and DRS duration are included in the timing information.

As for the design of the DRS, the two options illustrated in FIGS. 2 are under study. One purpose of introducing small cell detection is to make it possible to measure cells that are in the off state even when the small cells are on and off.

Figure 2A:
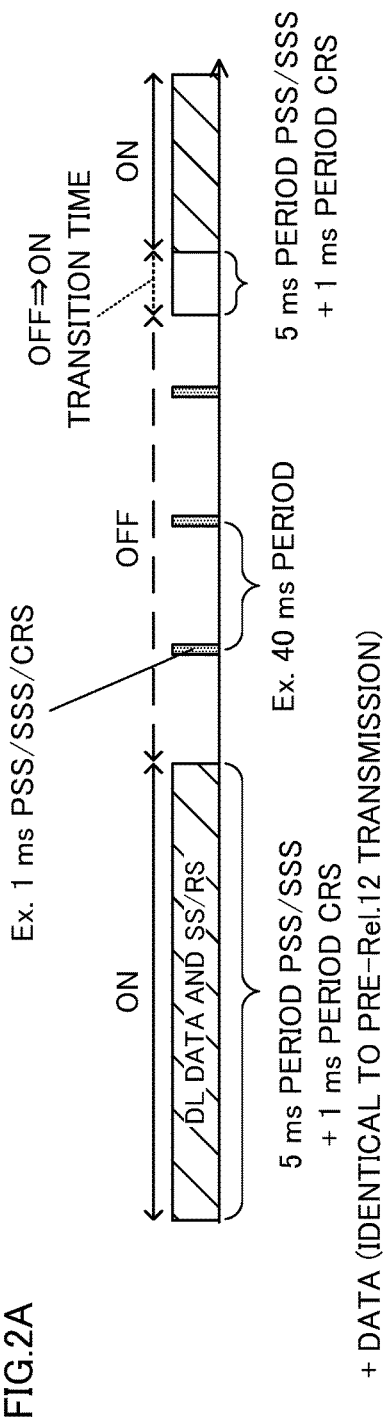
FIGS. 2 provide diagrams to explain the DRS in small cell detection.

In option #1 of the DRS shown in FIG. 2A, the PSS/SSS/CRS are transmitted in a long period, and in a short-term burst. During the regular on state, the DRS is a subset of a synchronization signal (SS) and a CRS, which are always transmitted. As shown in FIG. 2A, in the on state, the PSS/SSS are transmitted in a 5 [ms] period, and the CRS is transmitted in a 1 [ms] cycle, and, furthermore, data signals are transmitted. In the off state, for example, the PSS/SSS and the CRS are transmitted for 1 [ms], in a 40 [ms] cycle.

Figure 2B:
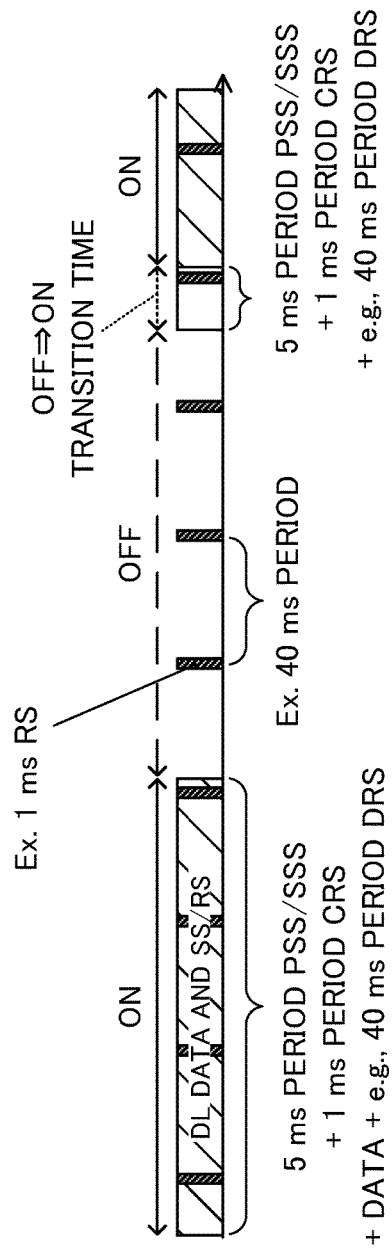

In option #2 of the DRS shown in FIG. 2 B, the PSS/SSS/CSI-RS are transmitted in a long cycle, and in a short-term burst. In the DRS, the PSS/SSS are a subset of regular synchronization signals (SSs) in the on state, as in option #1. Meanwhile, the CSI-RS in the DRS is transmitted in the on and off state for discovery, apart from the regular CSI-RS for measuring CSI. As shown in FIG. 2B, in the on state, PSS/SSS are transmitted in a 5 [ms] cycle, and, in a 1 [ms] cycle, the CRS and data signals are transmitted. The CSI-RS for discovery is, for example, transmitted for 1 [ms], in a 40 [ms] cycle, either in the on state or the off state.

The PSS/SSS that have been used since Rel. 8 LTE are designed so that a user terminal can autonomously search 504 physical cell IDs (PCIDs: Physical Cell IDs). Although there is a mechanism to report a list of nearby cells' physical cell IDs to a user terminal, the user terminal can identify the physical cell IDs of nearby cells from the PSSs/SSSs which the user terminal receives.

With the CRS that is transmitted in DRS option #1, usually, the transmission sequence, the transmission resource location and so on are determined uniquely from the physical cell ID. Therefore, when a given physical cell ID is detected from a PSS/SSS, in which resource or sequence the corresponding cell's RSRP/RSRQ should be measured is determined uniquely. In DRS option #1, even if there is no assist information other than the measurement timing configuration, the user terminal can still detect and measure nearby small cells.

Meanwhile, when the CSI-RS for discovery is transmitted in DRS option #2, if no value is indicated to the user terminal from the network through higher layer signaling, the user terminal recognizes that that the same physical cell ID as that used for the PSS/SSS is used as the scrambling ID to determine the transmission sequence. Also, if a value is indicated from the network, the user terminal uses that value as the scrambling ID. However, the transmission resource location (determined by the CSI-RS configuration index, the CSI-RS subframe config., the CSI-RS subframe offset, and so on) is usually uncorrelated with the physical cell ID, and therefore needs to be reported from the network.

In this way, in the event of DRS option #2, unless a mechanism to report cell-specific resource configuration indices is introduced on a regular basis, a user terminal has no way of knowing in which resource the user terminal has to carry out detection and measurement. This is because 504 physical cell IDs and maximum twenty patterns of CSI-RS configurations give as many as approximately ten thousand combinations. Therefore, in the event of DRS option #2, which cell uses which CSI-RS configuration may be reported to a user terminal.

In the event of the CSI-RS for measuring CSI, only the information pertaining to the serving cell being the measurement object needs to be reported to the user terminal. However, in the event of the CSI-RS for discovery, the network must report the set of CSI-RS configurations with respect to all the nearby cells that are the candidates for detection, to the user terminal.

Generally speaking, it is difficult to properly configure and manage every nearby cell's assist information, which is, for example, a set of a scrambling ID and a CSI-RS configuration. For example, when a new cell is installed, which nearby cells' information needs to be configured and managed as assist information poses a problem. Also, whether the assist information of the newly installed cell needs to supplied to all the nearby cells is another problem.

Meanwhile, in the event of a structure in which there are a plurality of RREs (Remote Radio Equipment) under one base station eNB, it is easy to configure and manage each RRE's information in one base station eNB. Same-cell-ID operation, in which the same physical cell ID is configured in all the PREs under a base station eNB, is one mode of operation in such a network structure.

However, if a measurement reference signal's sequence, resource location and so on are all determined from a physical cell ID as in DRS option #1, this raises the problem that, since completely identical reference signals may be transmitted between transmission points during same-cell-ID operation, each individual transmission point cannot be identified. If the CSI-RS is used as in DRS option #2, scrambling IDs that are different from the physical cell IDs, resource configurations and so on can be in each transmission point separately, so that it is possible to identify and measure the transmission points even during same-cell-ID operation.

Figure 3:
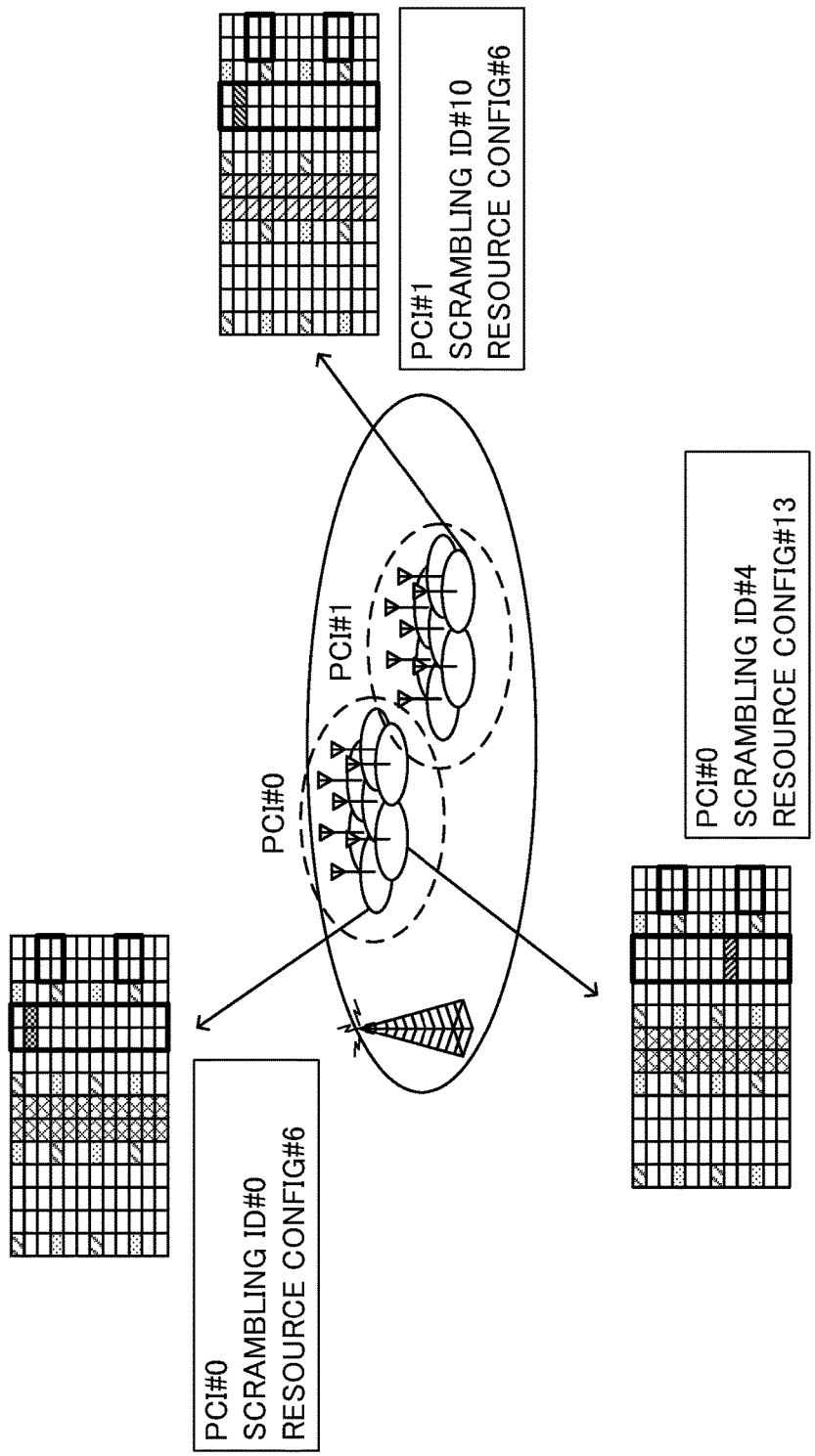
FIG. 3 is a diagram to show physical cell IDs (PCIs), scrambling IDs and resource configurations that are configured in small cells.

FIG. 3 is a diagram to show the physical cell IDs (PCIs), scrambling IDs and resource configurations that are configured in small cells. As shown in FIG. 3, in same-cell-ID operation, the physical cell IDs (PCIs) and the scrambling IDs and resource configurations of the measurement reference signal in DRS option #2 can be separated.

In order to make it possible to identify transmission points during same-cell-ID operation, and to make it possible to detect and measure small cells based on DRSs even when assist information other than the measurement timing configuration is not available, the present inventors have arrived at defining the user terminal operations in small cell detection separately between when assist information other than the measurement timing configuration is available and when assist information other than the measurement timing configuration is not available.

For example, when a large number of RREs are provided as small cells under one base station eNB, the base station eNB reports the scrambling ID of the measurement reference signal, the corresponding time/frequency resource configuration, the corresponding physical cell ID and so on to a user terminal as assist information, and the user terminal detects and measures the DRS in accordance with the assist information that is configured.

Alternatively, when every small cell is under a different base station eNB and it is difficult to manage the assist information, the base stations eNB provide no assist to the connecting user terminals other than providing timing information.

In this case, advanced rules are defined based on physical cell IDs acquired from the PSSs/SSSs and/or the like, so that the user terminals can determine the sequence patterns and measurement resource locations of the measurement reference signals.

By defining user terminal operations in this way, even when it is not possible to manage and assist detailed information pertaining to each small cell's DRS configuration as a network, user terminals can still detect and measure DRSs autonomously. Alternatively, when detailed information pertaining to each small cell's DRS configuration can be managed and assisted as a network, by taking advantage of this, it is possible to allow user terminals to execute more efficient DRS detection and measurement. Furthermore, it is possible to provide support for, for example, transmission point identification during same-cell-ID operation.

<Operation 1>

A case will be discussed below where a common DRS offset, cycle and duration are reported to user terminals as timing information, and where, furthermore, all the DRS transmission-related information of each small cell or transmission point is managed properly as a network.

In this case, in addition to timing information, the physical cell ID of each small cell or transmission point, the time/frequency resource configuration index, and the scrambling ID for use for the measurement reference signal, are reported to user terminals as assist information. A plurality of time/frequency resource configuration indices may be configured in each small cell or transmission point. Furthermore, when the subframe to transmit the measurement reference signal can be shifted per small cell or transmission point, the subframe offset is also reported as assist information.

Figure 4:
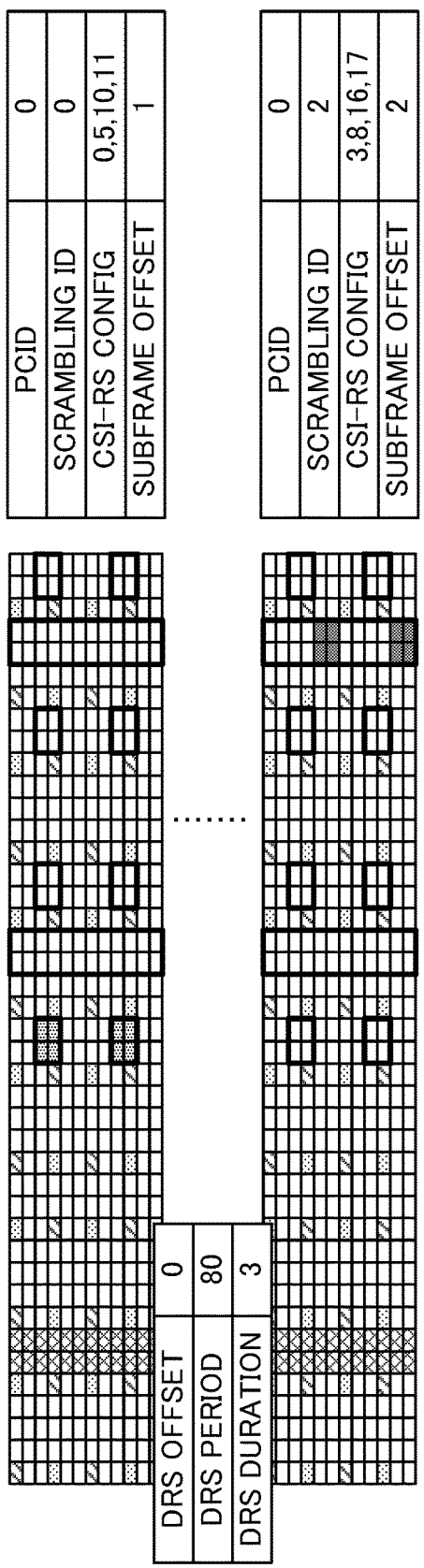
FIG. 4 is a diagram to show the configurations of the DRS of FIGS. 1.

FIG. 4 is a diagram to show the DRS of FIGS. 1. With this DRS, the DRS offset, the DRS period and the DRS duration are reported as timing information. In the example shown in FIG. 4, the DRS duration is three subframes, in which the PSS/SSS are transmitted as synchronization signals in the top subframe, and the CSI-RS is transmitted as a measurement reference signal in the rest of the subframes. Furthermore, with this DRS, the physical cell ID (PCID), the scrambling ID, the CSI-RS configuration index (CSI-RS config.) and the subframe offset are reported as examples of assist information.

When these pieces of information are reported, the user terminal executes DRS measurement using these. The user terminal, when detecting a PSS/SSS in accordance with the timing information, may limit, or may not limit, the candidates to detect based on the physical cell IDs included in the list of nearby cells reported. The user terminal may measure the measurement reference signals of the small cells or transmission points corresponding to the physical cell IDs that are acquired by PSS/SSS detection, or measure all the measurement reference signals that are reported.

That is, a user terminal can use the PSS/SSS for timing synchronization alone, or use the PSS/SSS for timing synchronization and identification of physical cell IDs.

<Operation 2>

A case will be discussed below where timing information to include the DRS duration is reported to user terminals, but the subframe offset value of each small cell or transmission point is not included in the assist information.

In this case, a user terminal may carry out the measurement operation on the assumption that the measurement reference signal is placed in conventional subframe locations in the DRS duration. The conventional subframe locations where the measurement reference signal is assumed to be placed have only to be defined in the specifications, and may be, for example, subframes in which the PSS/SSS are not included (see FIG. 5A). Alternatively, the user terminal may carry out the measurement operation on the assumption that the measurement reference signal is placed in all subframe locations in the DRS duration.

Figure 5A:
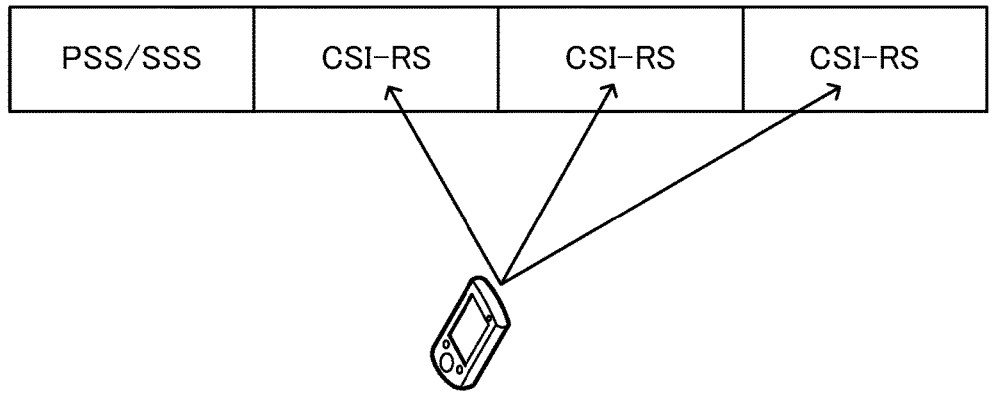
FIGS. 5 provide diagrams to explain examples of measurements by user terminals.

In the example shown in FIG. 5A, the DRS duration is four subframes, and the user terminal carries out the measurement operation on the assumption that the measurement reference signal (in FIG. 5A, the CSI-RS) is placed subframes not including the PSS/SSS.

<Operation 3>

A case will be discussed below where the DRS duration is not included in the timing information that is reported to user terminals.

In this case, when a PSS/SSS is detected, a user terminal may carry out the measurement operation on the assumption that the measurement reference signal is placed in conventional subframe locations with reference to the subframe where that PSS/SSS is included. The conventional subframe locations with reference to the subframe including the PSS/SSS have only to be defined in the specifications, and can be, for example, the same subframe as the subframe including the PSS/SSS, the subframe that comes right after this subframe, and so on (see FIG. 5B).

Figure 5B:
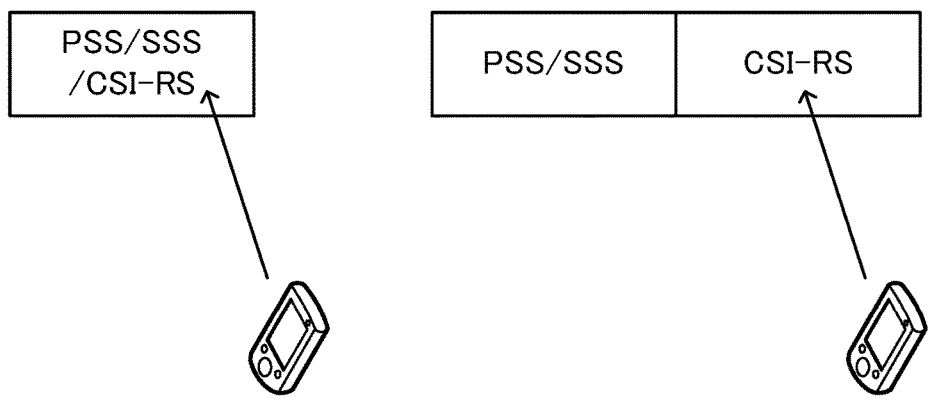

The DRS duration is not reported in the example shown in FIG. 5B, a user terminal carries out the measurement operation on the assumption the measurement reference signal (the CSI-RS in FIG. 5B) is placed in the same subframe as the subframe in which the PSS/SSS is included (the left example). Alternatively, the user terminal carries out the measurement operation on the assumption that the measurement reference signal (the CSI-RS in FIG. 5B) is placed in the subframe right after the subframe including the PSS/SSS (the right example).

<Operation 4>

A case will be discussed below where the physical cell ID of each small cell or transmission point is not included in the assist information to be reported to user terminals.

In this case, if a physical cell ID is acquired by PSS/SSS detection, a user terminal may assume that this physical cell ID is a scrambling ID for use for the measurement reference signal, and carry out measurement with respect to the time/frequency resource configuration corresponding to the detected physical cell ID (scrambling ID).

Alternatively, in the timing the PSS/SSS is detected, the user terminal may carry out measurement with respect to all sets of scrambling IDs for use for the measurement reference signal and time/frequency resource configurations that are reported as assist information. In this case, the user terminal does not assume that a physical cell ID is a scrambling ID to use for the measurement reference signal.

In the example shown in FIG. 6A, when the scrambling IDs to be used for the measurement reference signal are reported to a user terminal as assist information, the user terminal may measure all sets of these scrambling IDs that are reported and time/frequency resource configuration indices (in FIG. 6A, CSI-RS configuration indices). Alternatively, the user terminal may assume that a physical cell ID that is detected in PSS/SSS detection is a scrambling ID for use for the measurement reference signal, and carry out measurement only with respect to the time/frequency resource configuration index that corresponds to the physical cell ID that is detected.

<Operation 5>

A case will be discussed below where the scrambling IDs for use for the measurement reference signal of each small cell or transmission point are not included in the assist information that is reported to user terminals.

In this case, if a physical cell ID is acquired by PSS/SSS detection, a user terminal may assume that this physical cell ID is a scrambling ID for use for the measurement reference signal, and carry out measurement with respect to the corresponding time/frequency resource configuration.

Alternatively, the user terminal may assume that the scrambling IDs that are reported as assist information are the physical cell IDs, and carry out measurement with respect to all the time/frequency resource configurations that are assisted in the timings detected from the PSSs/SSSs.

<Operation 6>

A case will be discussed below where neither the physical cell IDs of small cells or transmission points nor the scrambling IDs for use for the measurement reference signal are included in the assist information that is reported to user terminals.

In this case, if a physical cell ID is acquired by PSS/SSS detection, a user terminal may assume that this physical cell ID is a scrambling ID, and measure the combinations with all the time/frequency resource configurations that are reported. Alternatively, the user terminal may carry out measurement with respect to the time/frequency resource configurations that include the value that is acquired from the detected physical cell ID based on a conventional rule. The conventional rule has only to be defined in the specifications, and can be, for example, mod (PCID, 5).

In the example shown in FIG. 6B, a user terminal may assume that the physical cell ID acquired by PSS/SSS detection is the scrambling ID, and measure the combinations with all the time/frequency resource configuration indices that are reported (in FIG. 6B, CSI-RS configuration indices). Alternatively, the user terminal may measure only the time/frequency resource configuration indices including mod (PCID, 5). For example, when the physical cell ID that is detected is 10, mod (PCID, 5)=0 holds, so that the user terminal measures the time/frequency resource configuration index including 0 in FIG. 6B.

As for the number of time/frequency resource configurations to configure in each small cell or transmission point, it is possible to report the number simultaneous configurations in the measurement configuration, which is assist information that is common to all cells, and report only one index value for the individual assist information for each small cell or transmission point (see FIG. 7). The "number of CSI reference signals configured" in TS 36. 211 Table 6. 10. 5. 2-1 corresponds to the number simultaneous configurations in this context.

When the above number of simultaneous configurations is not reported, the user terminal may interpret the time/frequency resource configuration that is reported based on the assumption that number simultaneous configurations=1. Alternatively, the user terminal may assume that the maximum number of time/frequency resource configurations included in the assist information of each small cell or transmission point is the number simultaneous configurations.

<Operation 7>

A case will be discussed below where information such as time/frequency resource configurations are not reported to user terminals as assist information, and only the timing information and the cell list (physical cell IDs) are reported.

In this case, a user terminal may limit, or may not limit, the object of PSS/SSS detection based on the cell list. The user terminal may assume that a physical cell ID acquired by PSS/SSS detection is a scrambling ID for use for the measurement reference signal, and measure the combinations with all the candidate time/frequency resource configurations. Alternatively, the user terminal may assume that a physical cell ID that is reported is a scrambling ID for use for the measurement reference signal, and measure the combinations with all the time/frequency resource configuration indices.

Alternatively, the user terminal may carry out measurement based on the assumption that a value that is acquired from a physical cell ID and a conventional rule is the time/frequency resource configuration index to correspond to that physical cell ID. The conventional rule has only to be defined in the specifications, and can be, for example, mod (PCID, X). As for the value of X, if the number of simultaneous configurations is reported as common assist information, this value may be used. If the number of simultaneous configurations is not reported as common assist information, the time/frequency resource configuration index may be derived based on the assumption that X=20 in the event of normal CPs (Cyclic Prefixes) and X=16 in the event of extended CPs. The CP length may be derived by way of PSS/SSS detection, or may be reported in advance from the network.

<Operation 8>

A case will be described below where no assist information is reported to user terminals other than timing information.

In this case, a user terminal may assume that a physical cell ID that is acquired by PSS/SSS detection is a scrambling ID, and measure the combinations with all the candidate time/frequency resource configurations. Alternatively, the user terminal may carry out measurement based on the assumption that a value that is acquired from a physical cell ID and a conventional rule is the time/frequency resource configuration index to correspond to that physical cell ID. The conventional rule has only to be defined in the specifications, and can be, for example, mod (PCID, 20).

<Examples of user Terminal Operations>

A user terminal can use the PSS/SSS only in timing synchronization, and, as for the measurement reference signal, measure all the candidates that are reported as assist information. Alternatively, the user terminal can use the PSS/SSS in timing synchronization and in physical cell ID identification, and, as for the measurement reference signal, measure the candidates corresponding to physical cell IDs that are detected.

First, the user terminal searches for the PSS/SSS in accordance with the timing information. When physical cell IDs are assisted, the detection candidates may be limited or may not be limited. As a result of the search, 0 or more combinations of synchronizing timings and physical cell IDs are found.

Next, the user terminal measures the RSRP/RSRQ by using the measurement reference signal, in accordance with the synchronizing timings that are detected. The user terminal may limit, or may not limit, the candidates of the measurement reference signal based on the physical cell IDs that are detected as a set with the synchronizing timings. When there is assist information of the time/frequency resource configurations, it is possible to make only those corresponding to the detected physical cell IDs the measurement object, or make all those that assisted the measurement object. When there is not assist information of the time/frequency resource configurations, it is possible to determine the time/frequency resource configurations to be the object of measurement based on the detected physical cell IDs, according to a conventional rule, or make all the possible candidates the object of measurement.

Figure 8A:
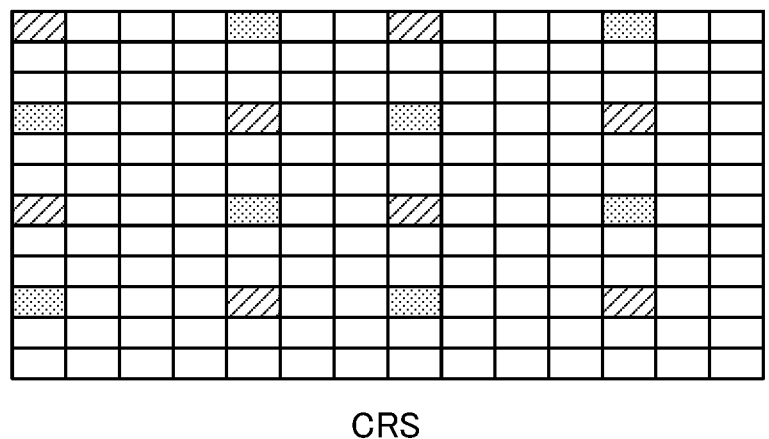
FIGS. 8 provide diagrams to explain the CRS and the PRS.
Figure 8B:
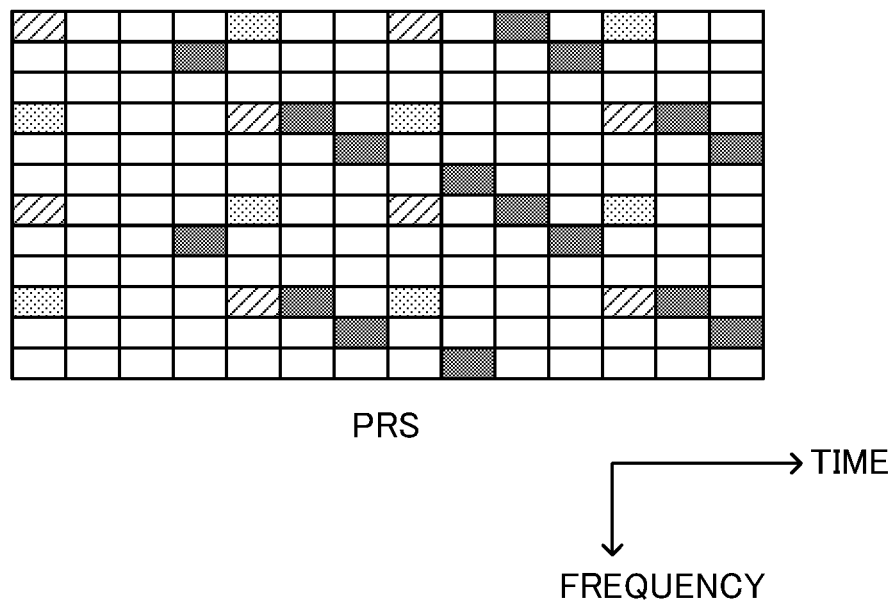

Although the present embodiment has been described with examples in which, in option #2 of the DRS, the PSS/SSS/CSI-RS are transmitted in a long cycle and in a short-term burst, it is possible to apply the above-described operation 1 to operation 8 likewise even when, instead of the CSI-RS, the CRS (see FIG. 8A), the PRS (Positioning Reference Signal (see FIG. 8B)) and so on are used.

In the event the conventional CRS and PRS are used, physical cell ID-based scrambling IDs and frequency shifts are applied. Although, in this case, small cells or transmission points can be measured based on physical cell IDs acquired from the PSS/SSS, without assist, it is not possible, for example, to identify transmission points during same-cell-ID operation.

As an example of enhancement of the CRS or the PRS for the DRS, it is possible to support identifying transmission points during same-cell-ID operation by applying scrambling IDs and frequency shifts based on VCIDs (Virtual Cell IDs) reported from the network, instead of physical cell IDs. It is also possible, during the DRS duration, to allow each cell to carry out transmission only in part of the subframes and assume non-transmission (muting) in the other subframes. However, if the CRS is not transmitted regularly in cells in the on state, this has an impact on conventional user terminals (legacy UEs), and therefore the above-described enhancements are presumed to be implemented in frequency carriers where there are no conventional user terminals.

In this case, the same user terminal operations as those in the above-described operations 2, 3 and 8 may be possible depending on whether or not the scrambling IDs are reported, whether or not the DRS duration or the subframe offset are reported, and so on.

(Structure of Radio Communication System)

Now, a structure of a radio communication system according to the present embodiment will be described.

Figure 9:
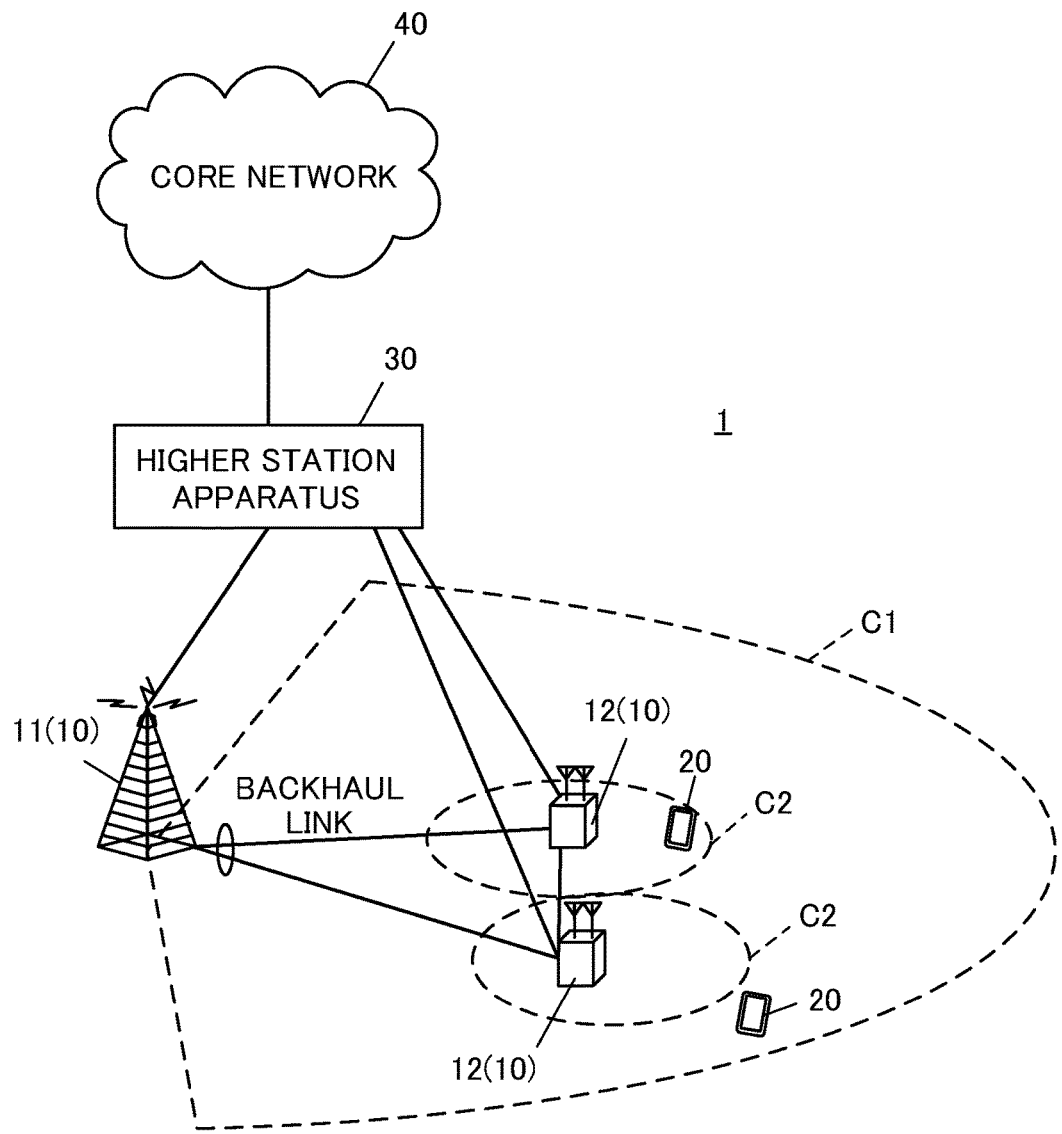
FIG. 9 is a diagram to show an example of a schematic structure of a radio communication system according to the present embodiment.

FIG. 9 is a schematic structure diagram to show an example of a radio communication system according to the present embodiment. As shown in FIG. 9, a radio communication system 1 is comprised of a plurality of radio base stations 10 (11 and 12), and a plurality of user terminals 20 that are present within cells formed by each radio base station 10 and that are configured to be capable of communicating with each radio base station 10. The radio base stations 10 are each connected with a higher station apparatus 30, and are connected to a core network 40 via the higher station apparatus 30.

In FIG. 9, the radio base station 11 is, for example, a macro base station having a relatively wide coverage, and forms a macro cell C1. The radio base stations 12 are, for example, small base stations having local coverages, and form small cells C2. Note that the number of radio base stations 11 and 12 is not limited to that shown in FIG. 9.

In the macro cell C1 and the small cells C2, the same frequency band may be used, or different frequency bands may be used. Also, the macro base stations 11 and 12 are connected with each other via an inter-base station interface (for example, optical fiber, the X2 interface, etc.).

Between the radio base station 11 and the radio base stations 12, between the radio base station 11 and other radio base stations 11, or between the radio base stations 12 and other radio base stations 12, dual connectivity (DC) or carrier aggregation (CA) may be employed.

The user terminals 20 are terminals to support various communication schemes such as LTE, LTE-A and so on, and may include both mobile communication terminals and stationary communication terminals. The user terminals 20 can communicate with other user terminals 20 via the radio base stations 10.

Note that the higher station apparatus 30 may be, for example, an access gateway apparatus, a radio network controller (RNC), a mobility management entity (MME) and so on, but is by no means limited to these.

In the radio communication system 1, a downlink shared channel (PDSCH: Physical Downlink Shared Channel), which is used by each user terminal 20 on a shared basis, downlink control channels (PDCCH (Physical Downlink Control Channel), EPDCCH (Enhanced Physical Downlink Control Channel), etc.), a broadcast channel (PBCH) and so on are used as downlink channels. User data, higher layer control information and predetermined SIBs (System Information Blocks) are communicated in the PDSCH. Downlink control information (DCI) is communicated by the PDCCH and the EPDCCH.

In the radio communication system 1, an uplink shared channel (PUSCH: Physical Uplink Shared Channel), which is used by each user terminal 20 on a shared basis, and an uplink control channel (PUCCH: Physical Uplink Control Channel) are used as uplink channels. User data and higher layer control information are communicated by the PUSCH.

Figure 10:
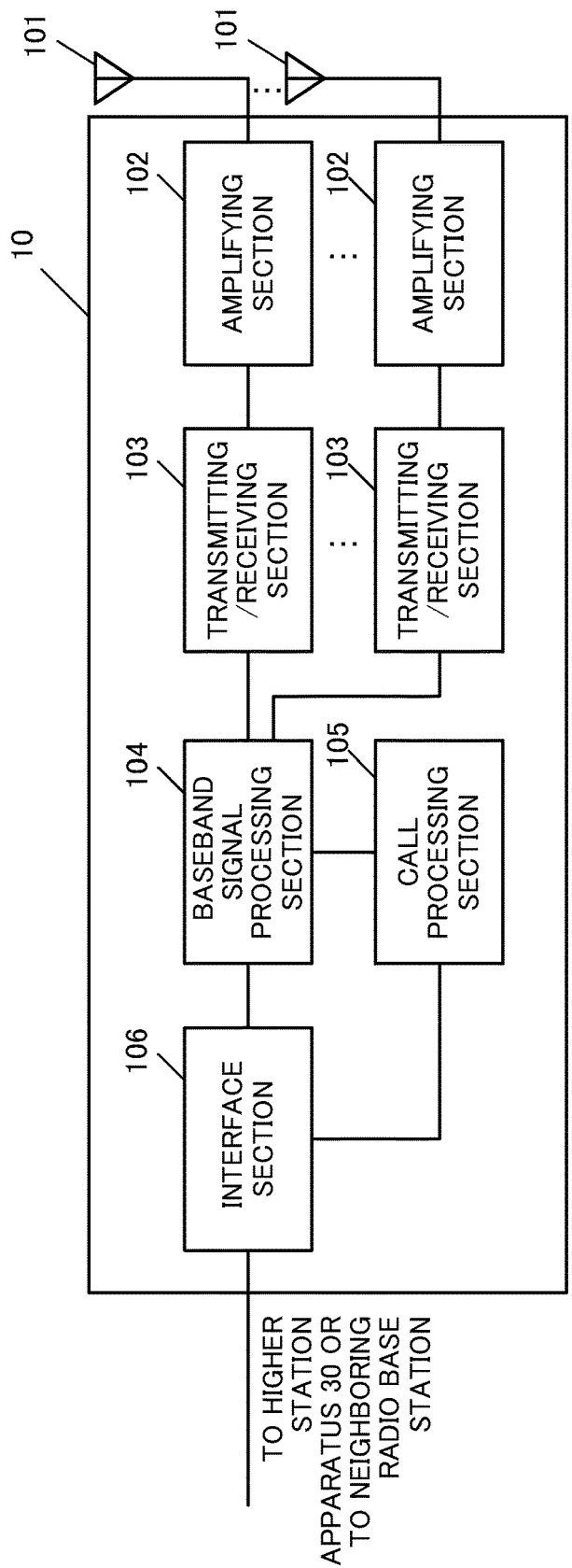
FIG. 10 is a diagram to show an example of an overall structure of a radio base station according to the present embodiment.

FIG. 10 is a diagram to show an overall structure of a radio base station 10 according to the present embodiment. As shown in FIG. 10, the radio base station 10 has a plurality of transmitting/receiving antennas 101 for MIMO communication, amplifying sections 102, transmitting/receiving sections 103, a baseband signal processing section 104, a call processing section 105 and an interface section 106.

User data to be transmitted from the radio base station 10 to a user terminal 20 on the downlink is input from the higher station apparatus 30, into the baseband signal processing section 104, via the interface section 106.

In the baseband signal processing section 104, a PDCP layer process, division and coupling of user data, RLC (Radio Link Control) layer transmission processes such as an RLC retransmission control transmission process, MAC (Medium Access Control) retransmission control, including, for example, an HARQ transmission process, scheduling, transport format selection, channel coding, an inverse fast Fourier transform (IFFT) process and a pre-coding process are performed, and the result is forwarded to each transmitting/receiving section 103. Furthermore, downlink control signals are also subjected to transmission processes such as channel coding and an inverse fast Fourier transform, and forwarded to each transmitting/receiving section 103.

Each transmitting/receiving section 103 converts the downlink signals, which are pre-coded and output from the baseband signal processing section 104 on a per antenna basis, into a radio frequency band. The amplifying sections 102 amplify the radio frequency signals having been subjected to frequency conversion, and transmit the signals through the transmitting/receiving antennas 101.

On the other hand, as for uplink signals, radio frequency signals that are received in the transmitting/receiving antennas 101 are each amplified in the amplifying sections 102, converted into baseband signals through frequency conversion in each transmitting/receiving section 103, and input in the baseband signal processing section 104.

In the baseband signal processing section 104, the user data that is included in the input uplink signals is subjected to an FFT process, an IDFT process, error correction decoding, a MAC retransmission control receiving process and RLC layer and PDCP layer receiving processes, and the result is forwarded to the higher station apparatus 30 via the interface section 106. The call processing section 105 performs call processing such as setting up and releasing communication channels, manages the state of the radio base station 10 and manages the radio resources.

The interface section 106 transmits and receives signals to and from neighboring radio base stations (backhaul signaling) via an inter-base station interface (for example, optical fiber, the X2 interface, etc.). Alternatively, the interface section 106 transmits and receives signals to and from the higher station apparatus 30 via a predetermined interface.

Figure 11:
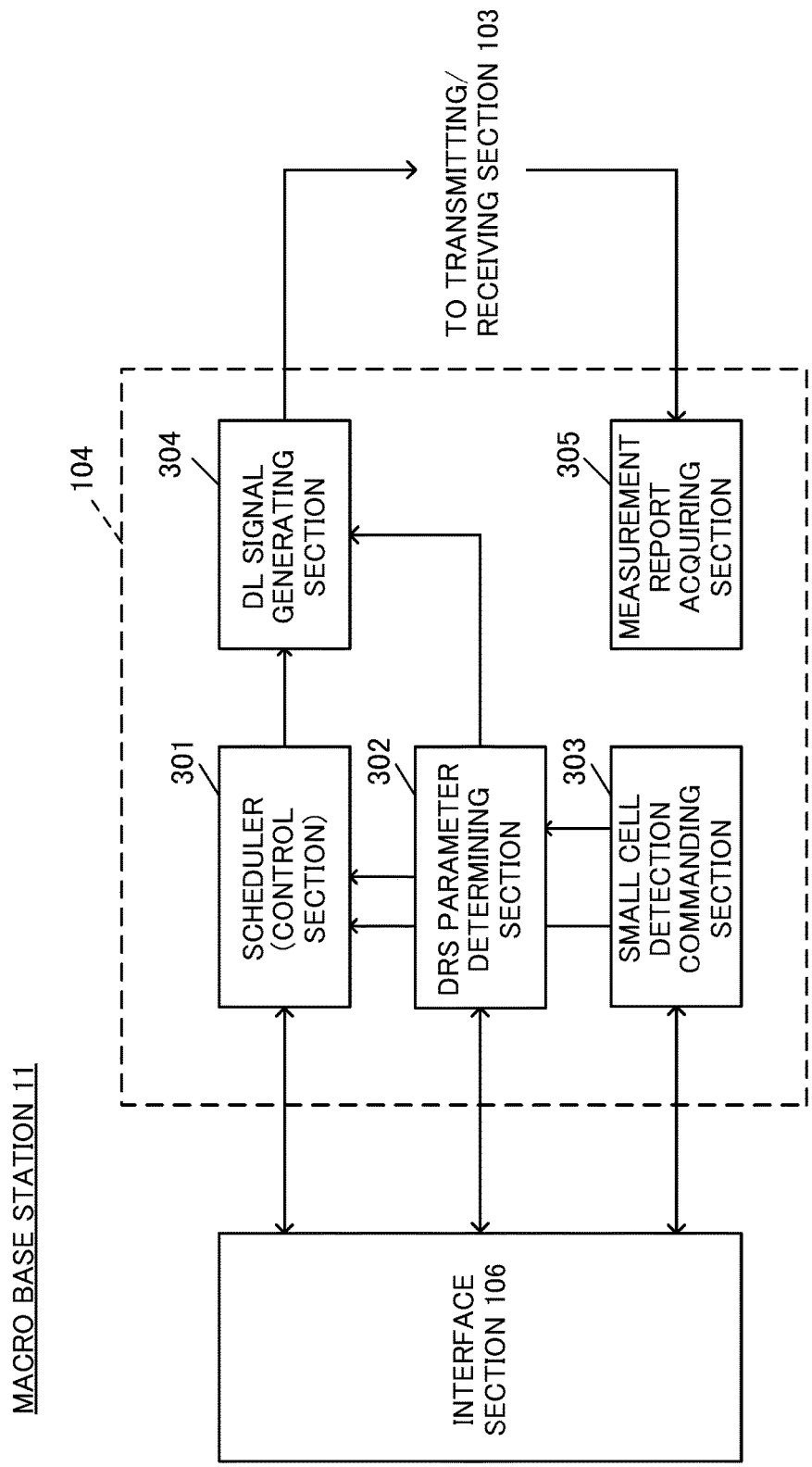
FIG. 11 is a diagram to show an example of a functional structure of a macro base station according to the present embodiment.

FIG. 11 is a diagram to show a functional structure of a macro base station 11 according to the present embodiment. Note that the following functional structure is formed with the baseband signal processing section 104 provided in the macro base station 11 and so on.

As shown in FIG. 11, the macro base station 11 is comprised at least of a scheduler (control section) 301, a DRS parameter determining section 302, a small cell detection commanding section 303, a DL signal generating section 304 and a measurement report acquiring section 305.

The scheduler 301 allocates the radio resources for the DL signals to transmit to the user terminals 20 and the radio resources for the UL signals to transmit from the user terminals 20 (scheduling). For example, the scheduler 301 commands the user terminals 20 to generate assist information in the DL signal generating section 304 when small cell detection is carried out.

In this case, as has been shown with the above embodiment, the scheduler 301 can include a small cell detection command (DiscoveryConfig) in MeasObject and report this to the user terminals 20, and, meanwhile, execute control so that the timing information and the assist information are included in the information element (DiscoveryRS-Config) to define the configuration of the detection reference signal.

The small cell detection commanding section 303 controls commands for small cell detection using the DRS, for the user terminals 20. For example, the small cell detection commanding section 303 gives commands to user terminals (connected UEs) connected with the macro base station 11 as to whether or not to carry out small cell detection in a predetermined frequency.

When commanding the user terminals 20 to carry out small cell detection using the DRS, the DRS parameter determining section 302 determines information related to the DRS parameters. The information related to the DRS parameters may include assist information. The information that is determined in the DRS parameter determining section 302 is output to the scheduler 301 and the DL signal generating section 304.

The DL signal generating section 304 generates DL signals based on commands from the scheduler 301 and the DRS parameter determining section 302. The signals generated in the DL signal generating section 304 are transmitted to the user terminals 20 via the transmitting/receiving sections 103.

The measurement report acquiring section 305 acquires measurement reports that are reported from the user terminals. The measurement report acquiring section 305 receives the results of small cell detection carried out in the user terminals by using the DRS, in the form of measurement reports. Then, the measurement report acquiring section 305 controls the connection of the user terminals 20 with the small cells based on the measurement reports.

Figure 12:
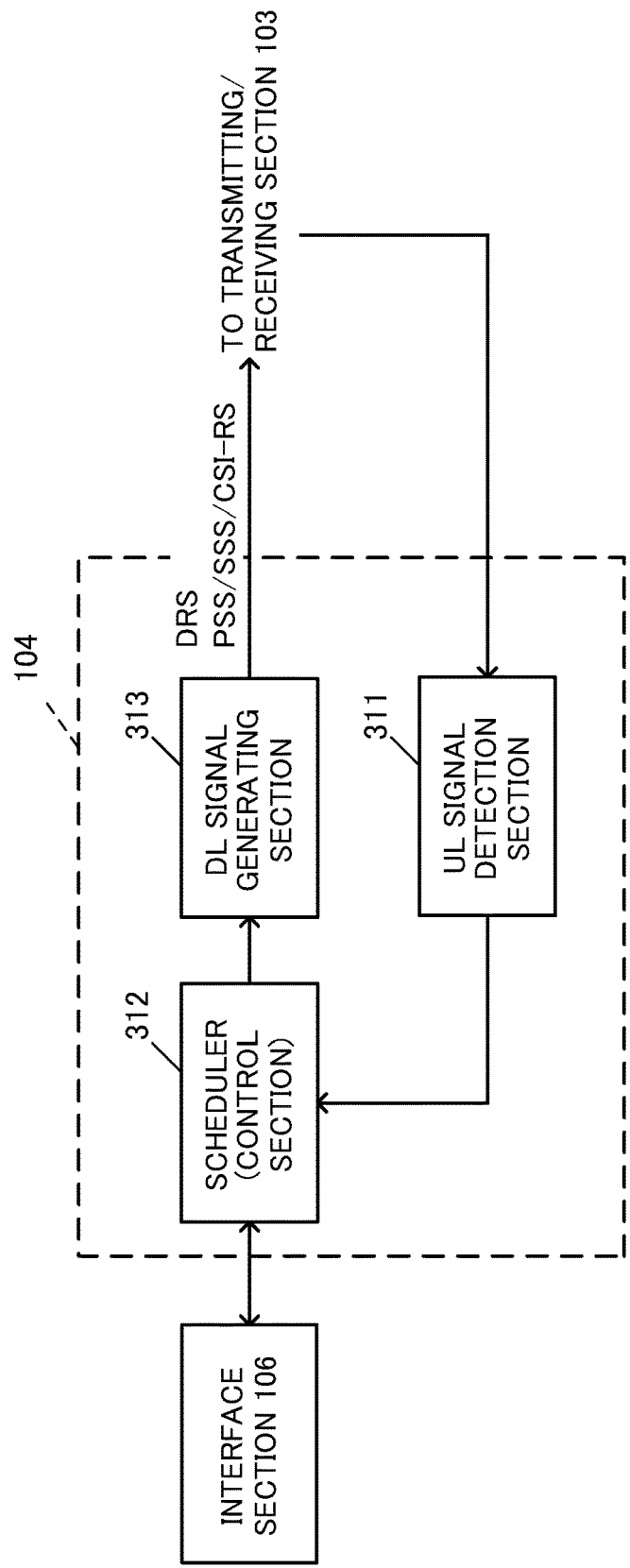
FIG. 12 is a diagram to show an example of a functional structure of a small base station according to the present embodiment.

FIG. 12 is functional structure diagram of a small base station 12 according to the present embodiment. Note that the following functional structure is formed with the baseband signal processing section 104 provided in the small base station 12 and so on.

As shown in FIG. 12, a small base station 12 is comprised at least of a UL signal detection section 311, a scheduler 312 and a DL signal generating section 313.

The UL signal detection section 311 detects the UL signals transmitted from the user terminals 20. The UL signal detection section 311 can receive measurement reports that are reported from the user terminals 20.

The scheduler 313 allocates the radio resources for the DL signals to transmit to the user terminals 20 (scheduling). Also, the scheduler 312 controls the transmission of the DRS.

The DL signal generating section 313 generates DL signals based on commands from the scheduler 312. For example, the DL signal generating section 313 generates synchronization signals (PSS/SSS), reference signals (CRS), small cell detection reference signals (DRS), control signals, data signals and so on. The signals generated in the DL signal generating section 313 are transmitted to the user terminals 20 via the transmitting/receiving sections 103.

Figure 13:
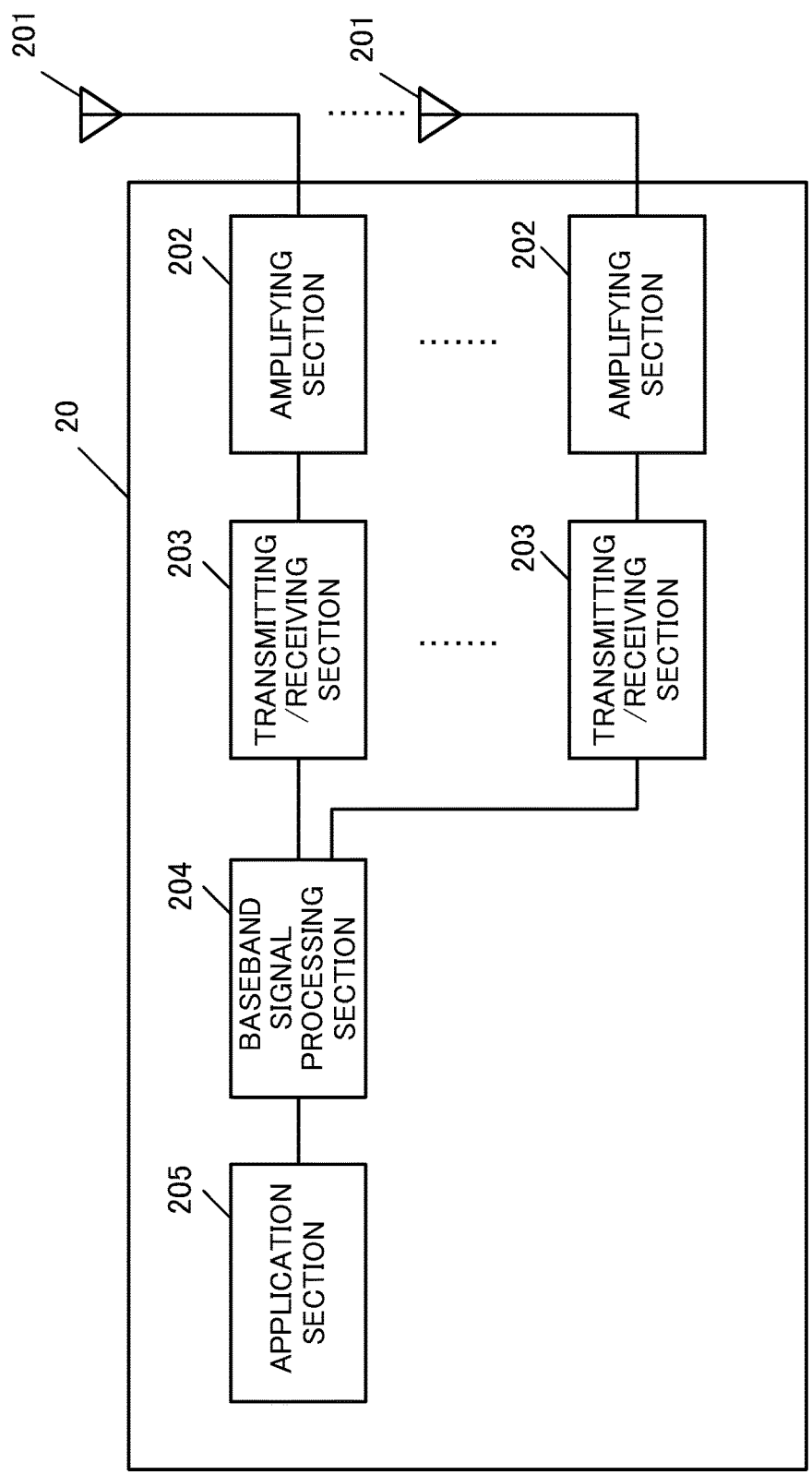
FIG. 13 is a diagram to explain an example of an overall structure of a user terminal according to the present embodiment.

FIG. 13 is a diagram to show an overall structure of a user terminal 20 according to the present embodiment. As shown in FIG. 13, a user terminal 20 has a plurality of transmitting/receiving antennas 201 for MIMO communication, amplifying sections 202, transmitting/receiving sections (receiving sections) 203, a baseband signal processing section 204 and an application section 205.

As for downlink data, radio frequency signals that are received in the plurality of transmitting/receiving antennas 201 are each amplified in the amplifying sections 202, and subjected to frequency conversion and converted into the baseband signal in the transmitting/receiving sections 203. This baseband signal is subjected to an FFT process, error correction decoding, a retransmission control receiving process and so on in the baseband signal processing section 204. In this downlink data, downlink user data is forwarded to the application section 205. The application section 205 performs processes related to higher layers above the physical layer and the MAC layer, and so on. Furthermore, in the downlink data, broadcast information is also forwarded to the application section 205.

Meanwhile, uplink user data is input from the application section 205 to the baseband signal processing section 204. The baseband signal processing section 204 performs a retransmission control (HARQ (Hybrid ARQ)) transmission process, channel coding, pre-coding, a DFT process, an IFFT process and so on, and the result is forwarded to each transmitting/receiving section 203. The baseband signal that is output from the baseband signal processing section 204 is converted into a radio frequency band in the transmitting/receiving sections 203. After that, the amplifying sections 202 amplify the radio frequency signal having been subjected to frequency conversion, and transmit the resulting signal from the transmitting/receiving antennas 201.

Figure 14:
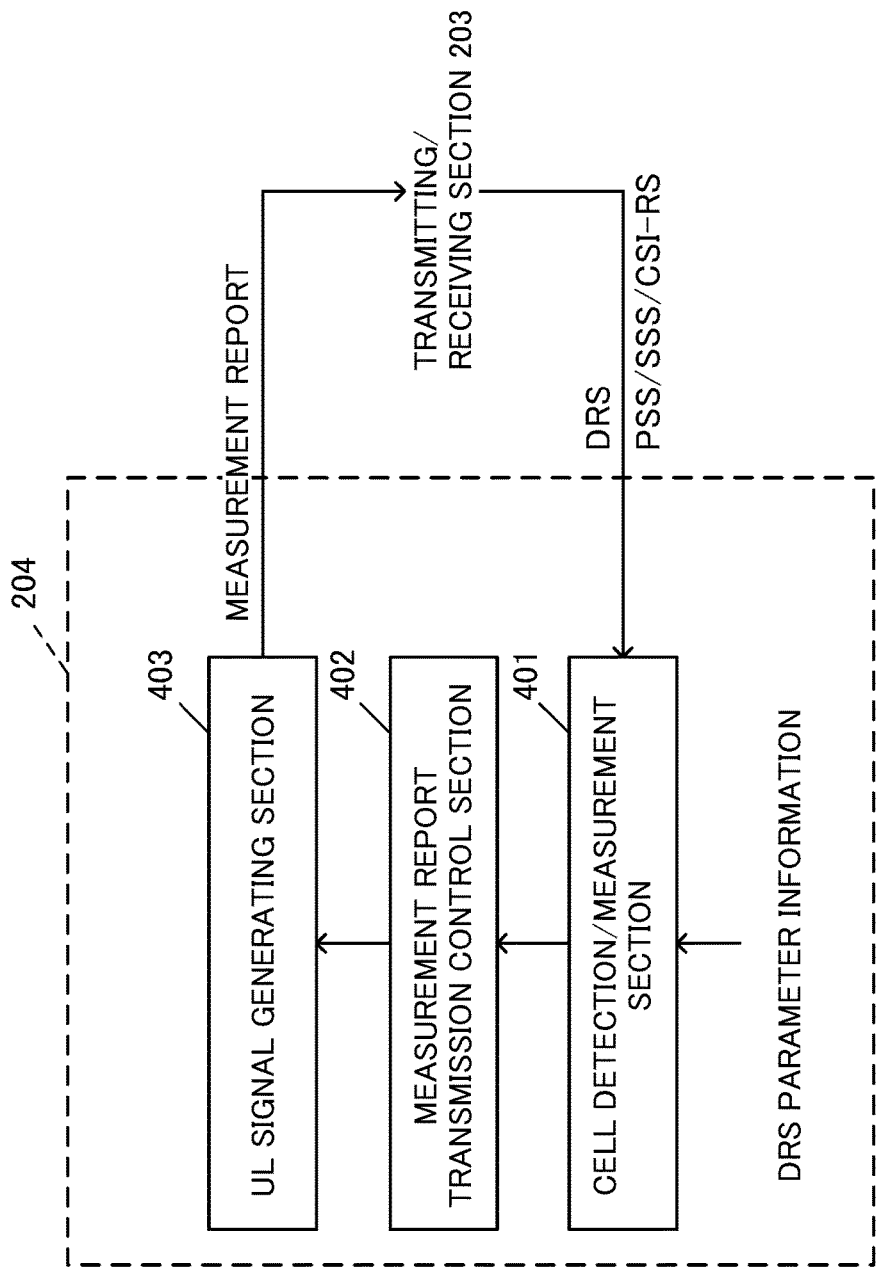
FIG. 14 is a diagram to explain an example of a functional structure of a user terminal according to the present embodiment.

FIG. 14 is a diagram to show a principle functional structure of the baseband signal processing section 204 provided in the user terminal 20. As shown in FIG. 14, the baseband signal processing section 204 provided in the user terminal 20 at least has a cell detection/measurement section 401, a measurement report transmission control section 402 and a UL signal generating section 403.

The cell detection/measurement section 401 carries out small cell detection by using the DRSs that are transmitted from the small base stations 12. Also, the cell detection/measurement section 401 receives information related to small cell detection commands from the macro base station 11 through RRC signaling. Also, when small cell detection is carried out, the cell detection/measurement section 401 detects the DRSs based on information related to DRS parameters, which is reported from the macro base station 11 (assist information).

Based on the result of small cell detection carried out in the cell detection/measurement section 401, the measurement report transmission control section 402 controls the transmission of measurement reports. For example, the measurement report transmission control section 402 acquires the cell identity/RSRP/RSRQ, which correspond to a predetermined cell, and which are acquired by small cell detection. In this case, the measurement report transmission control section 402 controls the network (base station) to report the measurement result as a measurement report.

The measurement report transmission control section 402 controls the transmission of measurement reports based on the result acquired by small cell detection.

The UL signal generating section 403 generates measurement reports and so on based on commands from the measurement report transmission control section 402. Furthermore, the UL signal generating section 403 also generates uplink control signals such as delivery acknowledgement signals and so on, and uplink data signals.

Note that the present invention is by no means limited to the above-described embodiment and can be implemented with various changes. The sizes and shapes illustrated in the accompanying drawings in relationship to the above embodiment are by no means limiting, and may be changed as appropriate within the scope of optimizing the effects of the present invention. Besides, implementations with various appropriate changes may be possible without departing from the scope of the object of the present invention.

The disclosure of Japanese Patent Application No. 2014-097143, filed on May 8, 2014, including the specification, drawings and abstract, is incorporated herein by reference in its entirety.

The invention claimed is:
1. A user terminal comprising:
a receiving section that receives a first cell detection indication that specifies information applicable for a discovery signal measurement and includes timing information and assist information transmitted from a second cell;

a detection section that detects a synchronization signal included in a discovery signal transmitted from a first cell, in accordance with the timing information; and a measurement section that performs the discovery signal measurement using a CSI-RS that is included in the discovery signal and is configured separately from a CSI-RS configured for channel state measurement, in accordance with the assist information and the synchronization signal detected, wherein the timing information includes values of an offset, a period and a duration of the discovery signal, the assist information includes values of a physical cell ID of the first cell or a transmission point, a scrambling ID used for the CSI-RS for discovery, a resource configuration and a subframe offset, and the subframe offset is an offset between a subframe of a synchronization signal of a cell identified by the physical cell ID and a subframe of the CSI-RS of the first cell.

2. The user terminal according to claim 1, wherein the receiving section receives the first cell detection indication (DiscoveryConfig) included in an information element (MeasObject) that defines a measurement object.

3. The user terminal according to claim 1, wherein the CSI-RS for discovery is transmitted in a given cycle, irrespective of whether the first cell is in an on state or in an off state.

4. A base station forming a second cell and communicating with a user terminal that is connectable to a first cell, the base station comprising:

a commanding section that indicates, to the user terminal, a detection process using a discovery signal that is transmitted from the first cell and includes a CSI-RS for discovery configured separately from a CSI-RS configured for channel state measurement; and a transmission section that transmits a detection indication that specifies information applicable for a discovery signal measurement and includes timing information and assist information to the user terminal, wherein the transmission section includes values of an offset, a period and a duration of the discovery signal in the timing information and includes at least one of values of a physical cell ID of the first cell or a transmission point, a scrambling ID used for the CSI-RS for discovery, a resource configuration and a subframe offset in the assist information, and wherein the subframe offset is an offset between a subframe of a synchronization signal of a cell identified by the physical cell ID and a subframe of the CSI-RS of the first cell.

5. A radio communication method for a user terminal, comprising:

receiving a first cell detection indication that specifies information applicable for a discovery signal measurement and includes timing information and assist information transmitted from a second cell;

detecting a synchronization signal included in a discovery signal transmitted from a first cell, in accordance with the timing information; and performing the discovery signal measurement using a CSI-RS included in the discovery signal and is configured separately from a CSI-RS configured for channel state measurement, in accordance with the synchronization signal and the assist information, wherein the timing information includes values of an offset, a period and a duration of the discovery signal, the assist information includes at least one of, or does not include, values of a physical cell ID of the first cell or a transmission point, a scrambling ID used for the CSI-RS for discovery, a resource configuration and a subframe offset, and the subframe offset is an offset between a subframe of a synchronization signal of a cell identified by the physical cell ID and a subframe of the CSI-RS of the first cell.

* * * * *